March 7, 1944.  H. H. HARKINS  2,343,551
ADHESIVE COMPOSITION
Filed July 2, 1938
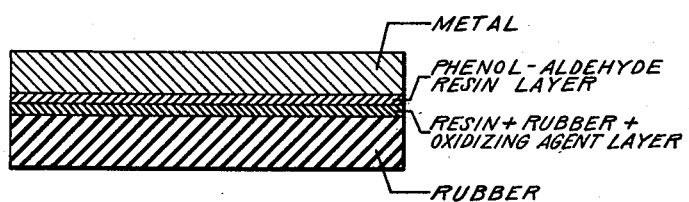
INVENTOR.
HENRY H. HARKINS
BY
ATTORNEY.

Patented Mar. 7, 1944

2,343,551

UNITED STATES PATENT OFFICE 2,343,551

ADHESIVE COMPOSITION

Henry H. Harkins, North Providence, R. I., assignor, by mesne assignments, to United States Rubber Company, New York, N. Y., a corporation of New Jersey Application July 2, 1938, Serial No. 217,228

5 Claims. (Cl. 260—3)

This invention relates to adhesive compositions, their preparation, and use, and more particularly to methods of bonding rubber to metal and the resulting articles.

An object of the invention is to provide a rubber to metal adhesive, and particularly one which will give consistent adhesion of vulcanized rubber to metal. Another object is to provide a composition which is non-gelling in solution and which may therefore be kept for long periods of time under ordinary storage conditions without danger of "setting up," i. e., gelling, with attendant loss of adhesive properties. A further object is to provide an adhesive composition which will work satisfactorily at temperatures as low as 180–200° F., thus allowing its use in connection with field work where steam pressure for vulcanization is not available. A still further object is to provide a method of making a quick drying rubber-to-metal adhesive having the above advantages. Other objects will be apparent from the following description.

The adhesive composition of the present invention comprises rubber, a soluble reactive phenolic resin, and an oxidizing agent. The term "soluble" is indicative of the solubility of the resin in an organic solvent such as alcohol or benzol. The term "reactive" refers to those resins which normally are reactive to heat to polymerize to a hardened condition. The oxidizing agent may be inorganic, or organic, or both may be used. The term "oxidizing agent" herein refers to those solid oxidizing agents which are capable of effecting a vulcanizing action on rubber, alone or in combination with other oxidizing agents. The term "oxidizing agent" herein therefore excludes such as ferric oxide which is not an oxidizing agent for the purpose of the present invention. Examples of such oxidizing agents include tetrachloroquinone, parabenzoquinone, benzoyl peroxide, polynitroaryl compounds, quinone-imine compounds such as benzoquinone dioxime, etc. The herein useable organic oxidizing agents also function as vulcanizing agents for rubber, and are further exemplified in Fisher U. S. P. 1,918,328 and Fisher French Patent No. 806,500. The preferred inorganic oxidizing agents are those containing oxygen and a multivalent metal, e. g., lead peroxide, manganese dioxide, mercuric oxide, lead chromate, etc. Any desired pigment or color may be added such as carbon black, etc. In employing such a composition in bonding rubber to metal, it is necessary to first apply to the metal a base coat of phenolic resin, pigmented or not, and then applying over the base coat the composition containing the oxidizing agent. The rubber stock to be vulcanized to the metal which may be of any desired type or kind, is then applied over the composition containing the oxidizing agent, and the assembly is heated to vulcanize the rubber. The general assembly is shown by the figure of the drawing.

Without the oxidizing agent in the intermediate coating, good adhesion is not obtainable when using reactive resins which are monohydric phenol-aldehyde condensation products. Whereas the polyhydric phenol resins, e. g. heat reactive resorcinol condensation products, may be used without the oxidizing agents, the results are superior with the use of the oxidizing agents. The oxidizing agent alone without the reactive resin does not provide good adhesion. It is believed the oxidizing agent, under the influence of heat, cooperates with the reactive resin to "vulcanize" the rubber, i. e., becomes chemically combined with the rubber, whereas in a heated mixture of rubber and reactive resin alone the rubber and the resin are merely physically intermingled and not chemically united. The oxdizing agent modifies the resin in such a way that while it is no longer capable of adhering directly to metal, it will adhere to a layer of the unmodified resin itself, which in turn will adhere strongly to metal and other surfaces. Hence the use of the base coat. The mechanism of bonding rubber to metal is as follows: The base cement consisting of heat polymerizable resin, when heated, undergoes polymerization and becomes firmly united with the metal surface. In the intermediate cement, when heated, the rubber becomes vulcanized by the combined action of the resin and the oxidizing agent, and the resin becomes hardened, the resulting composition being strongly adhesive both to the superposed rubber and to the base coat of resin cement. Consequently, a strong bond is obtained between the rubber and the metal.

The following data, in which the parts are by weight, shows this vulcanizing phenomenon:

| | Stocks | | |
|---|---|---|---|
| | X | Y | Z |
| Pale crepe | 100 | 100 | 100 |
| Alcohol-soluble Bakelite resin | 8 | 8 | |
| Lead chromate | | 80 | 80 |

The above stocks were subjected to curing temperature (186° C.) in a press for 60, 120, and 180 min. respectively. After such treatment stocks X and Z were soluble in benzol and gasoline like ordinary crude rubber. Stock Y, however, was not dissolved by these solvents and otherwise had the characteristic of vulcanized rubber. Similar results are obtainable with the benzol-soluble Bakelites, namely those made from cresol or butyl phenol condensed with formaldehyde.

The use of sulphur or sulphur-containing vulcanizing agents may be obviated, if desired, by the present invention in the bonding of rubber to metal. This is sometimes desired in order to avoid sulphur tarnish or dissolution of sulphur from the rubber by liquids. Furthermore any of the oxidizing agents may be used singly or in admixture with any of the other oxidizing agents for the purposes of the invention.

The Bakelite type resins have little or no affinity for rubber vulcanized with sulphur, hence an ordinary sulphur-rubber stock when vulcanized in direct contact with a layer of Bakelite provides but poor, if any, adhesion between the vulcanized rubber and Bakelite. By the present invention it has been found that rubber can be securely adhered directly to the Bakelite type resins provided the rubber is vulcanized in contact with the resin-containing mass by non-sulphur organic oxidizing agents which act as vulcanizing agents for rubber such as tetrachloroquinone or other such compounds referred to. If desired, a sulphur-rubber stock may be applied over the non-sulphur rubber stock, no difficulty attaching to adhering the two rubber stocks.

The following examples are given to illustrate the invention, the parts being by weight:

*Example 1.*—A cement made by dissolving 100 parts of a potentially reactive alcohol-soluble phenol-aldehyde resin (Bakelite XR-5948) and suspending 40 parts thermatomic carbon in 100 parts ethyl alcohol is made up, and sand blasted steel coated with this cement, and the solvent allowed to evaporate. A stock of the composition

| | |
|---|---|
| Pale crepe | 100 |
| Tetrachloroquinone | 4 |
| Hexamethylene tetramine | 2 | is sheeted out and rolled on to the steel coated with cement as above. The assemblage is heated in open steam 2 hrs. at 20 lbs. Very good adhesion is obtainable.

In place of tetrachloroquinone, equally good results are obtainable with p-benzoquinone, and p-benzoquinone dioxime.

*Example 2.*—An alcohol cement of 100 parts of alcohol soluble reactive Bakelite resin (XR-5948) and 40 parts channel black is laid down on the metal surface.

To 100 parts of rubber (pale crepe) on the mill is added 100 parts of a potentially reactive alcohol-soluble phenol-aldehyde resin powder (BR-2428), 50 parts channel black, 4 parts tetrachloroquinone, 50 parts lead chromate, and the mass is dissolved in a mixture consisting of equal parts of gasoline (72° Bé.) and cyclohexyl acetate. This cement is laid down over the metal already coated with the first cement as given above. The cement coats are allowed to dry thoroughly, then the cement surface moistened with gasoline or other suitable solvent and then the desired vulcanizable rubber stock, the surface of which is also moistened with gasoline or other solvent, is rolled firmly onto the cement layer containing the oxidizing agent. An example of such a rubber stock is as follows: Pale crepe 100; tetrachloroquinone 4; light magnesium oxide 20; magnesium carbonate 10; di-beta naphthyl p-phenylene diamine (anti-oxidant) 1.

The rubber to metal assemblage is heated in open steam at 20 lbs. steam pressure for about 2 hrs. The adhesion is uniform and very strong, namely on the order of 200 lbs. per sq. in., as determined by quantitative adhesion tests approved by the American Society for Testing Materials.

*Example 3.*—A base cement was prepared in alcohol using 100 parts of alcohol soluble Bakelite resin (XR-5948), 120 parts ferric oxide, and 500 parts of alcohol. A thin coat of this base cement is applied by brush or other suitable means to a sandblasted steel surface.

To 100 parts of rubber on a cold mill is added 100 parts of reactive Bakelite powder (BR-2428) and then as soon as the Bakelite is milled in, the mill is warmed up to melt the Bakelite and disperse it uniformly in the rubber. 50 parts of channel black, 50 parts of lead chromate, and 4 parts of tetrachloroquinone are now milled in. 182 parts of this stock are dissolved in 540 parts of solvent consisting of equal parts of gasoline and amyl acetate. This furnishes the intermediate cement.

Two coats of the intermediate cement are applied by brush over the base cement and the cements are allowed to dry thoroughly.

After the cement coats are thoroughly dried, the surface is moistened with gasoline, and a gasoline moistened stock of the following composition is applied: Rubber 100; zinc oxide 5; thermatomic carbon 20; heptaldehyde-aniline condensate (accelerator) .375; sulphur 2.5; antioxidant 0.5.

The assemblage is heated in open steam for 60 minutes at 40 lbs. per sq. in. steam pressure. Adhesion tests show that the above stock after vulcanization adheres to the steel with a force of 500 pounds per sq. in. at room temperature. When the rubber to metal sample is heated to 130° C. and held at this temperature until all parts of the rubber have reached 130° C. and then the rubber pulled away from the metal, the adhesion is still over 100 lbs. per sq. in.

As distinguished from the monohydric phenol resin or Bakelite resins, the resorcinol resins have been found to exhibit good adhesive properties without the addition of the oxidizing agent in the intermediate cement, although the resorcinol resin may replace monohydric phenol-aldehyde resin, or be used therewith, in the examples using the oxidizing agent, for the purposes of bonding either sulphur or nonsulphur rubber stocks to metal.

*Example 4.*—200 grams of resorcinol and 70 grams of 37% formaldehyde are heated together in a boiling water bath for 20 min. The reaction vessel is then transferred to an oil bath and heated 45 min. at 150–155° C. Most of the water is driven off by this heat treatment and a viscous, alcohol-soluble resin is obtained. 200 grams of 95% alcohol are added to the resin to furnish a base cement.

A rubber-resin adhesive mixture is then made as follows: 15 grams of the base cement, 50 grams of 15% rubber cement in gasoline, .1 cc. cyclohexanol, and 12 cc. of 4% solution of hexamethylenetetramine in 95% alcohol are mixed together.

A rubber stock to be vulcanized to the metal is as follows: Rubber 100; zinc oxide 5; heptaldehyde aniline condensate .375; sulphur 2.5; antioxidant .5.

Sandblasted steel is given one coat of the base resin cement and this is followed by two coats of the rubber-resin cement. After drying, the solid rubber stock is rolled on to the coated steel surface and the assembly heated 2 hrs. in open steam at 20 lbs. pressure.

Both hard vulcanized or soft vulcanized rubber stocks, or so-called flexible hard rubbers, containing Neoprene (polymerized chloroprene) or Vistanex (polymerized isobutylene), may be adhered to metal by means of the present adhesive compositions. When compounded with fats, waxes or oils, the best results are obtained in those rubber stocks compounded with less than 5 parts by weight of the fatty acids, fatty acid soaps, or oils.

The adhesive composition may be used to adhere rubber to a wide variety of metals, in fact to any metal to which Bakelite will adhere, including zinc, steel, tin, brass, bronze, copper, aluminum, lead, Dow metal, etc., as well as to glass, wood, etc.

The invention has a variety of uses, one of which is in connection with the manufacture of engravers' blankets where a layer of rubber plus rubberized fabric is satisfactorily adhered to sheet lead by the use of the present oxidizing agent-rubber adhesive compositions as given above. Other uses are in the lining of tanks, conduits, coating, wire, etc.

The term rubber herein refers to natural rubbers such as pale crepe, smoked sheet, spray dried rubbers, etc.

The amount of oxidizing agent may vary within a wide range, ordinarily those amounts which are effective as vulcanizing agents for rubber being preferred, in the case of the organic oxidizing agents. For example, suitable proportions of organic oxidizing agent are from 3 to 10% by weight of the rubber in the adhesive composition; suitable proportions of inorganic oxidizing agents may range from 10 to 200% by weight of the rubber. It is to be understood that in using mixtures of the organic and inorganic oxidizing agents less of either is required than where either is used alone. The amount of reactive resin in such composition may range from 20 to 125%, or more, by weight of the rubber.

Having thus described my invention, what I claim and desire to protect by Letters Patent is:

1. An adhesive composition comprising rubber, a soluble reactive phenol-aldehyde resin, and lead chromate in an organic solvent.

2. An adhesive composition comprising rubber, a soluble reactive phenol-aldehyde resin, and a halogenated quinone in an organic solvent.

3. An adhesive composition comprising rubber, a soluble reactive phenol-aldehyde resin, and tetrachloro p-benzoquinone in an organic solvent.

4. An adhesive composition comprising rubber, a soluble reactive phenol-aldehyde resin, tetrachloro p-benzoquinone, and lead chromate in an organic solvent.

5. A process which comprises effecting the vulcanization of rubber by means of the combined action of a soluble reactive phenol-aldehyde resin and lead chromate.

HENRY H. HARKINS.